US010451889B2

United States Patent
Shao et al.

(10) Patent No.: US 10,451,889 B2
(45) Date of Patent: Oct. 22, 2019

(54) OPTICAL COMMUNICATIONS MODULE HAVING AN OPTICS SYSTEM THAT IMPROVES LINK PERFORMANCE, AND METHODS

(71) Applicant: Avago Technologies International Sales Pte, Limited, Singapore (SG)

(72) Inventors: Bing Shao, Sunnyvale, CA (US); Ye Chen, San Jose, CA (US); Li Ding, Pleasanton, CA (US); Omid Momtahan, Palo Alto, CA (US); Jared D. Stack, Charlotte, NC (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 630 days.

(21) Appl. No.: 14/919,829

(22) Filed: Oct. 22, 2015

(65) Prior Publication Data
US 2017/0115499 A1    Apr. 27, 2017

(51) Int. Cl.
*G02B 27/42* (2006.01)
*H04B 10/27* (2013.01)
*H04B 10/67* (2013.01)

(52) U.S. Cl.
CPC ......... *G02B 27/4233* (2013.01); *H04B 10/27* (2013.01); *H04B 10/671* (2013.01)

(58) Field of Classification Search
CPC ........ H04B 10/27; H04B 10/40; H04B 10/43; G02B 27/4233–27/4255
USPC ..................... 398/135–172, 202–214; 385/37
See application file for complete search history.

(56) References Cited

U.S. PATENT DOCUMENTS

| | | | |
|---|---|---|---|
| 4,553,155 A * | 11/1985 | Chen | H01L 31/03046 257/257 |
| 5,479,540 A | 12/1995 | Boudreau et al. | |
| 5,774,239 A | 6/1998 | Feldman et al. | |
| 6,349,159 B1 | 2/2002 | Uebbing et al. | |
| 6,452,669 B1 | 9/2002 | Morris, Jr. et al. | |
| 6,496,621 B1 | 12/2002 | Kathman et al. | |
| 6,678,079 B1 * | 1/2004 | Amadon | G02B 5/32 19/34 |
| 6,952,507 B2 | 10/2005 | Johnson et al. | |
| 8,019,233 B2 | 9/2011 | Chen et al. | |

(Continued)

FOREIGN PATENT DOCUMENTS

WO    WO0205004 A2    1/2002

OTHER PUBLICATIONS

Amphawan, Angela, Holographic mode-selective launch for bandwith enhancement in multimode fiber, Optics Express, May 9, 2011, 10 pages, vol. 19, No. 10, Optical Society of America.

(Continued)

*Primary Examiner* — Kimberly N. Kakalec
(74) *Attorney, Agent, or Firm* — Sheridan Ross P.C.

(57) ABSTRACT

An optics system is provided that comprises a glass-based diffractive optical element (DOE) for coupling an optical signal passing out of an optical waveguide into a photodetector. The glass-based DOE improves optical link performance by performing one or more of shortening a response time of a photodetector, preventing an overloading condition of the photodetector from occurring and managing back reflection of light from the photodetector. The glass-based DOE is relatively inexpensively to manufacture and is reliable over a wide range of temperatures.

24 Claims, 8 Drawing Sheets

(56) References Cited

U.S. PATENT DOCUMENTS

| | | | |
|---|---|---|---|
| 8,326,097 B2 | 12/2012 | Cunningham | |
| 8,436,293 B2 | 5/2013 | Chang | |
| 2002/0075911 A1* | 6/2002 | Cham | G02B 6/4204 |
| | | | 372/29.011 |
| 2003/0072526 A1* | 4/2003 | Kathman | G02B 6/29311 |
| | | | 385/31 |
| 2004/0008414 A1 | 1/2004 | Coleman et al. | |
| 2005/0130072 A1* | 6/2005 | Koeda | G02B 5/1857 |
| | | | 430/321 |
| 2006/0245697 A1* | 11/2006 | Toillon | G02B 6/4202 |
| | | | 385/88 |

OTHER PUBLICATIONS

Dubois, F.; Emplit, Ph. and Hugon, O., Selective mode excitation in graded-index multimode fiber by a computer-generated optical mask, Optics Letters, Apr. 1, 1994, pp. 433-435, vol. 19, Issue 7, Optical Society of America, http://dx.doi.org/10.1364/OL.19.000433.

Bhatnagar, Aparna; Debaes, Christof; Thienpont, Hugo and Miller, David A.B., Receiverless detection schemes for optical clock distribution, Proceedings of the SPIE—The International Society for Optical Engineering, Jul. 6, 2004, pp. 352-359, vol. 5359, No. 1.

Jaksic, Zoran, Micro and Nanophotonics for Semiconductor Infrared Detectors, Chapter 2, 2014, pp. 43-128, Springer International Publishing, Switzerland.

\* cited by examiner

OPTICAL COMMUNICATIONS MODULE HAVING AN OPTICS SYSTEM THAT IMPROVES LINK PERFORMANCE, AND METHODS

TECHNICAL FIELD OF THE INVENTION

The invention relates to optical communications networks over which data is communicated in the form of optical signals over optical waveguides. More particularly, the invention relates to an optical communications module having an optics system that improves link performance.

BACKGROUND OF THE INVENTION

In optical communications networks, optical communications modules are used to transmit and/or receive optical signals over optical fibers. Optical receiver modules are optical communication modules that receive optical signals, but do not transmit optical signals. Optical transmitter modules are optical communication modules that transmit optical signals, but do not receive optical signals. Optical transceiver modules are optical communication modules that transmit and receive optical signals.

An optical transmitter or transceiver module has a light source that is driven by a driver circuit to cause the light source to generate amplitude and/or phase and/or polarization modulated optical signals that represent data. The modulated optical signals are optically coupled onto an end of an optical fiber by an optics system of the module. The light source is typically a laser diode or light emitting diode (LED). The optics system typically includes one or more reflective (e.g., mirrors), refractive (e.g., lenses) and/or diffractive (e.g., gratings) elements.

An optical receiver or transceiver module includes a photodetector (e.g., a p-doped-intrinsic-n-doped (PIN) diode) that detects an optical data signal passing out of an end of an optical fiber and converts the optical data signal into an electrical signal, which is then amplified and processed by electrical circuitry of the module to recover the data. An optics system of the module optically couples the optical data signals passing out of the end of the optical fiber onto the photodetector.

As the demand for data throughput continues to increase, the data rate, or bandwidth, of optical links is being pushed ever higher. While various transceiver and optical fiber link designs enable the bandwidth of optical fiber links to be increased, there are limitations on the extent to which currently available technologies can increase the bandwidth of an optical link. One way to increase the bandwidth of an optical link is to shorten the response time of the photodetector. A shortened response time can be achieved by manufacturing the photodetector to have a smaller aperture size, and therefore lower capacitance. However, current manufacturing technologies are limited in their ability to achieve a very small aperture size mainly because of the side effects of using small active areas to collect photons. Even if a very small aperture size is achievable, the optics system of the receiver or transceiver module still needs to be capable of tightly focusing the optical data signal passing out of the end of the optical fiber to form a small beam spot on the aperture of the photodetector with achievable assembly processes and robust performance over the range of operating conditions.

The optics system is usually an imaging system formed by refractive lenses. For a given wavelength and a given light propagation medium, the diameter of the beam spot formed by a lens increases linearly with increased focal length of the lens and decreased incoming beam size. Therefore, for an optical element to achieve a decreased beam spot diameter, either the focal length of the lens must be decreased or its diameter must be increased to accommodate the increased incoming beam size. In parallel optical transceiver modules, the lens diameter is often limited due to other system constraints to a maximum diameter of 250 micrometers (microns). In order to achieve a higher data rate without further increasing the lens diameter, the focal length of the lens must be decreased, which requires either that the lens be made of a material having a higher refractive index or that the lens be made to have a larger sagittal depth (sag) value, which introduces aberrations.

Plastic refractive lenses typically used in the field of optical fiber communications have a higher refractive index than lenses made of glass, but plastic lenses also have a higher coefficient of thermal expansion (CTE) than glass lenses. The higher CTE of plastic lenses can lead to problems at extreme temperatures. Glass lenses made by photolithographic processes are more reliable than plastic lenses at extreme temperatures, but photolithography has limitations with regard to controlling the lens shape. Although molding processes can be used to make glass lenses with larger sag values and better controlled shapes, glass lens molding processes are expensive to perform and difficult to scale up for multiple channels.

In addition to the bandwidth requirement for higher data rate communication, it is also important to control optical back-reflection in order to stabilize the optical output from the transmitter. The stability of the transmitted signal determines the bit-error-rate (BER) of the link, which is a key performance metric. In an imaging system made of refractive lenses, the back reflection from the photodetector directly contributes to destabilization of the source, and therefore needs to be carefully managed. One way to suppress the back reflection is to tighten the anti-reflection coating specification on the surface of photodetector, which inevitably increases the cost of the device. Another way to suppress back reflection is to introduce an oblique incident beam to the photodetector by skewing the optics system. This method, however, can significantly complicate the assembly processes, which also introduces higher costs.

Higher data rate applications often imply higher output power from the transmitter. In a single-mode optical fiber link, where the fiber size is substantially smaller than in multimode optical fiber links, a de-magnified focus spot can sometimes cause an overload condition in the photodetector to occur. However, de-magnification is almost always preferred in order to minimize the impact of fiber misalignment. One solution to this dilemma is to use a non-imaging optics system to manipulate the spot size to maintain a certain minimal level while keeping the overall coupling system de-magnified.

A need exists for an optics system that improves link performance by (1) forming a tight focus spot on the photodetector to enable higher bandwidth, (2) manipulating the focus spot size as needed to avoid an overload condition of the photodetector, and (3) managing optical back-reflecton without increasing overall cost. In addition, a need exists for such an optics system that can be manufactured relatively inexpensively and that is reliable over a wide range of temperatures.

DETAILED DESCRIPTION OF AN ILLUSTRATIVE EMBODIMENT

Illustrative embodiments are disclosed herein of an optics system that improves optical link performance by (1) forming a tightly-focused beam spot on the photodetector that shortens the response time of the photodetector, (2) manipulating the beam spot size as needed to avoid an overloading condition of the photodetector, and/or (3) managing back reflection from the photodetector to prevent destabilization of the light source at the far end of the optical link. In addition, the optics system is relatively inexpensive to manufacture and is reliable over a wide range of temperatures. Illustrative embodiments are also disclosed herein of a method of selecting, based on a measurement of an electrical signal output from a photodetector, an optics system design that shortens the response time of the photodetector. The optics system comprises a glass-based diffractive optical element (DOE) having a diffractive pattern that shapes the beam in a predetermined manner to selectively control the beam spot size on the photodetector. The glass-based DOE has a relatively low CTE, and is therefore reliable over a wide range of temperatures.

The glass-based DOE is typically made by a photolithographic process, although other processes may be used to make the glass-based DOE. The glass-based DOE has greater uniformity and higher transparency than plastic materials (e.g., polyetherimide) of the type commonly used in optical communications. The greater uniformity and higher transparency of the glass-based DOE facilitates alignment between the DOE and the photodetector. In addition, the glass-based DOE is free of refractive index non-uniformity and birefringence, which allows a smaller beam spot size to be achieved with very little aberration. All of these characteristics of the glass-based DOE increase the alignment tolerance margin for aligning the DOE with the photodetector.

Illustrative, or exemplary, embodiments of the glass-based DOE and associated methods will now be described with reference to the figures, in which like reference numerals represent like components, elements or features. It should be noted that elements, components or features in the figures are not necessarily drawn to scale, emphasis instead being placed on demonstrating principles and concepts of the invention.

Figure 1:
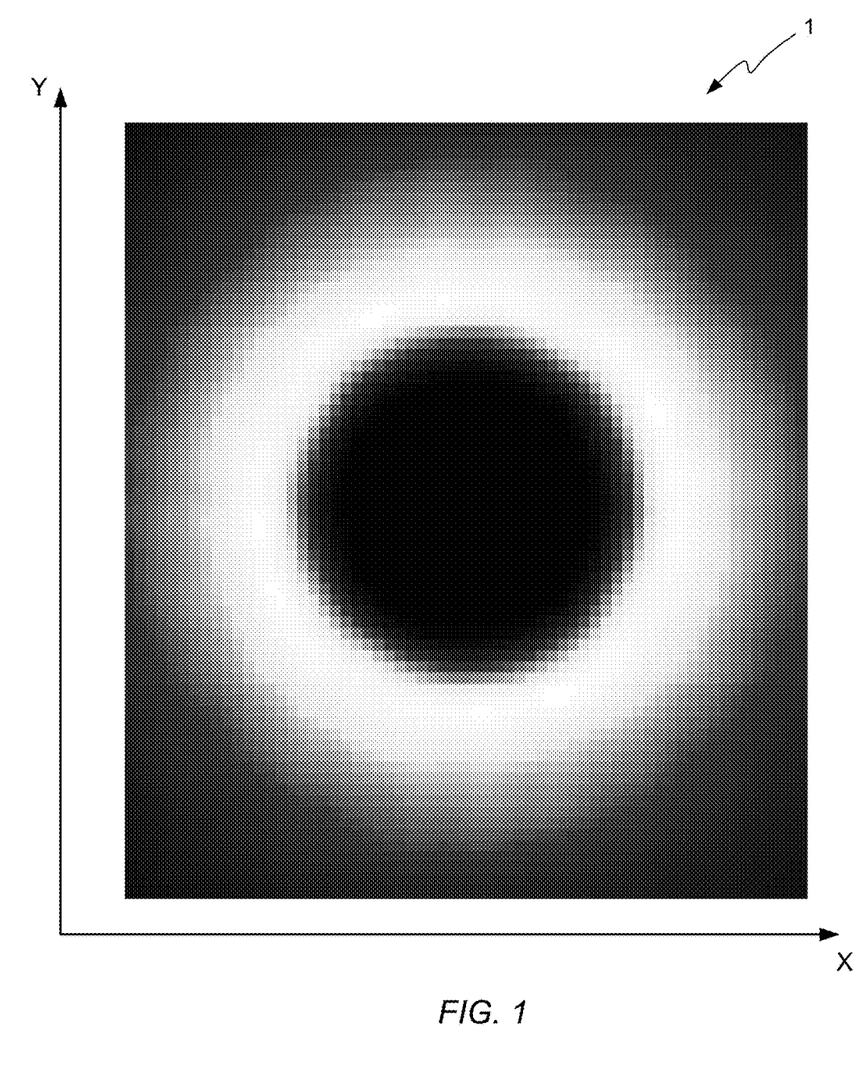
FIG. 1 illustrates a plan view of a ring-shaped light beam spot created by a glass-based diffractive optical element (DOE) of an optics system and coupled onto an aperture of a photodetector, in accordance with an illustrative embodiment.

FIG. 1 illustrates a plan view of a ring-shaped light beam spot 1 created by the glass-based DOE (not shown) of the optics system and coupled onto an aperture of a photodetector (not shown), in accordance with an illustrative embodiment. Brighter regions in the image represent higher intensity distributions and darker regions in the image represent lower intensity distributions. The bright, ring-shaped region in FIG. 1 is a predetermined spatial intensity distribution pattern selected to increase the response time of the photodetector. Most of the optical energy avoids the center of the aperture of the photodetector and is concentrated in a ring-shaped region that surrounds the center of the aperture.

Figure 2A:
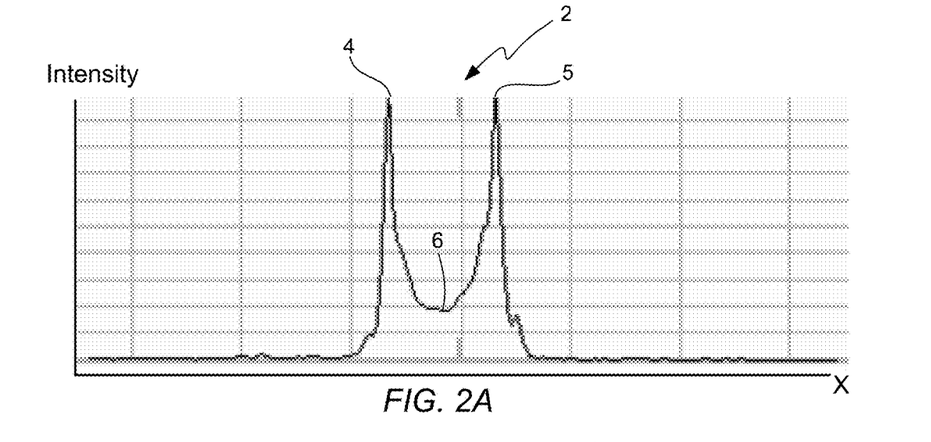
FIGS. 2A and 2B are intensity distribution plots of the intensity distribution pattern shown in FIG. 1 as a function of the X- and Y-dimensions, respectively, of an X-Y plane of an X, Y, Z Cartesian coordinate system in which the photosensitive region of the photodetector lies.
Figure 2B:
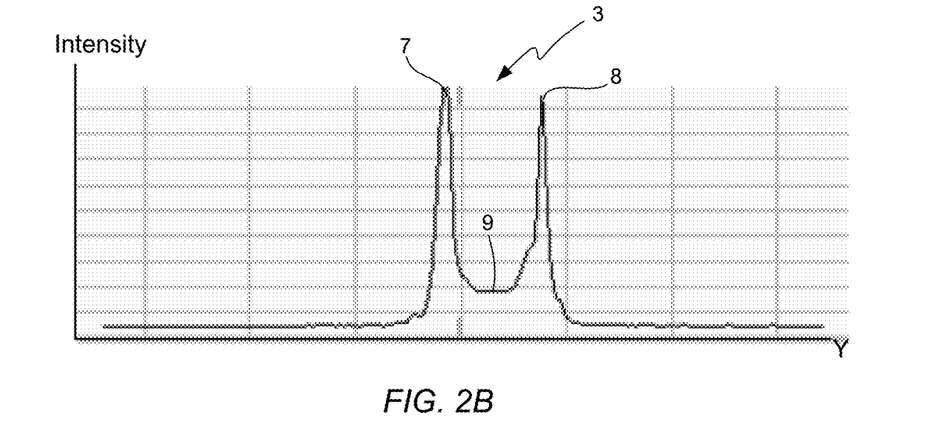

FIGS. 2A and 2B are intensity distribution plots 2 and 3, respectively, of the intensity distribution pattern shown in FIG. 1 as a function of the X- and Y-dimensions, respectively, of an X-Y plane of an X, Y, Z Cartesian coordinate system in which the photosensitive region of the photodetector lies. The intensity distribution plots 2 and 3 shown in FIGS. 2A and 2B, respectively, are very similar to one another in that each has two intensity distribution peaks that are separated by an intensity distribution trough. The intensity distribution peaks 4 and 5 shown in FIG. 2A are separated by the intensity distribution trough 6. The intensity distribution peaks 7 and 8 shown in FIG. 2B are separated by the intensity distribution trough 9. The troughs 6 and 9 correspond to the central dark region in FIG. 1 and the peaks 4, 5, 7, and 8 correspond to the bright, ring-shaped region shown in FIG. 1.

Figure 3:
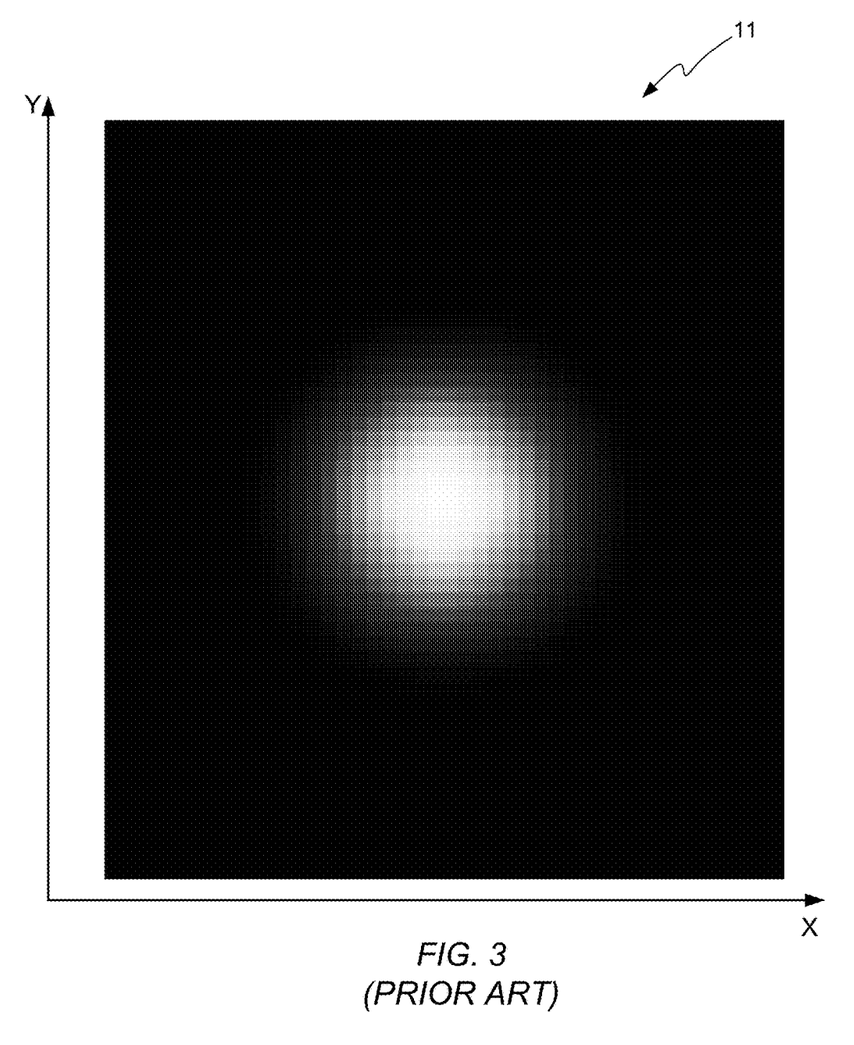
FIG. 3 illustrates a plan view of a focused light beam spot created by a conventional refractive lens of a conventional optics system and coupled onto a photosensitive region of a photodetector.

FIG. 3 illustrates a plan view of a focused light beam spot 11 created by a conventional refractive lens (not shown) of a conventional optics system and coupled onto a photosensitive region of a photodetector (not shown). The brightest region is a focused beam spot in the center of the photosensitive region of the photodetector, which is where substantially all of the optical energy is concentrated. Although features in the drawings are not necessarily to scale, the ring-shaped light beam spot 1 shown in FIG. 1 could have a maximum diameter that is about the same as the diameter of the beam spot 11 shown in FIG. 3 and yet result in the photodetector having an increased response speed.

Figure 4A:
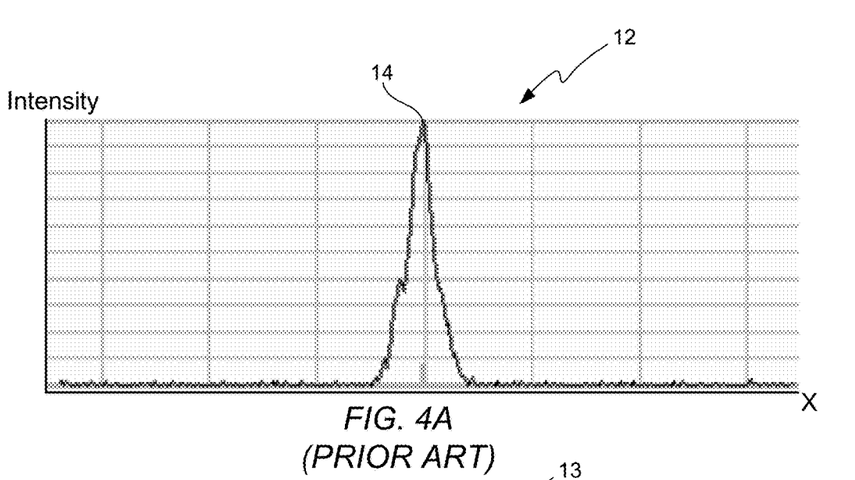
FIGS. 4A and 4B are graphs of intensity distribution plots of the intensity distribution pattern shown in FIG. 3 as a function of the X- and Y-dimensions, respectively, of an X-Y plane in which the photosensitive region of the photodetector lies.
Figure 4B:
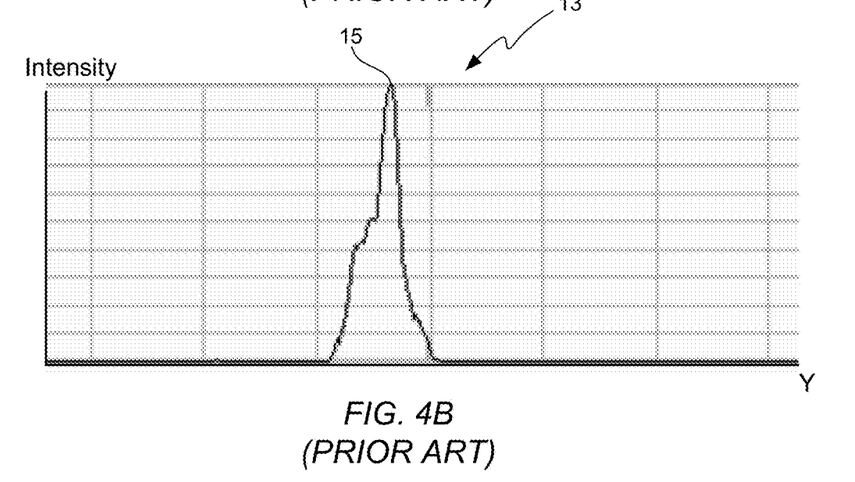

FIGS. 4A and 4B are graphs of intensity distribution plots 12 and 13, respectively, of the intensity distribution pattern shown in FIG. 3 as a function of the X- and Y-dimensions, respectively, of an X-Y plane in which the photosensitive region of the photodetector lies. The intensity distribution plots 12 and 13 shown in FIGS. 4A and 4B, respectively, are very similar to one another in that each has a single intensity distribution peak 14 and 15, respectively.

Figure 5:
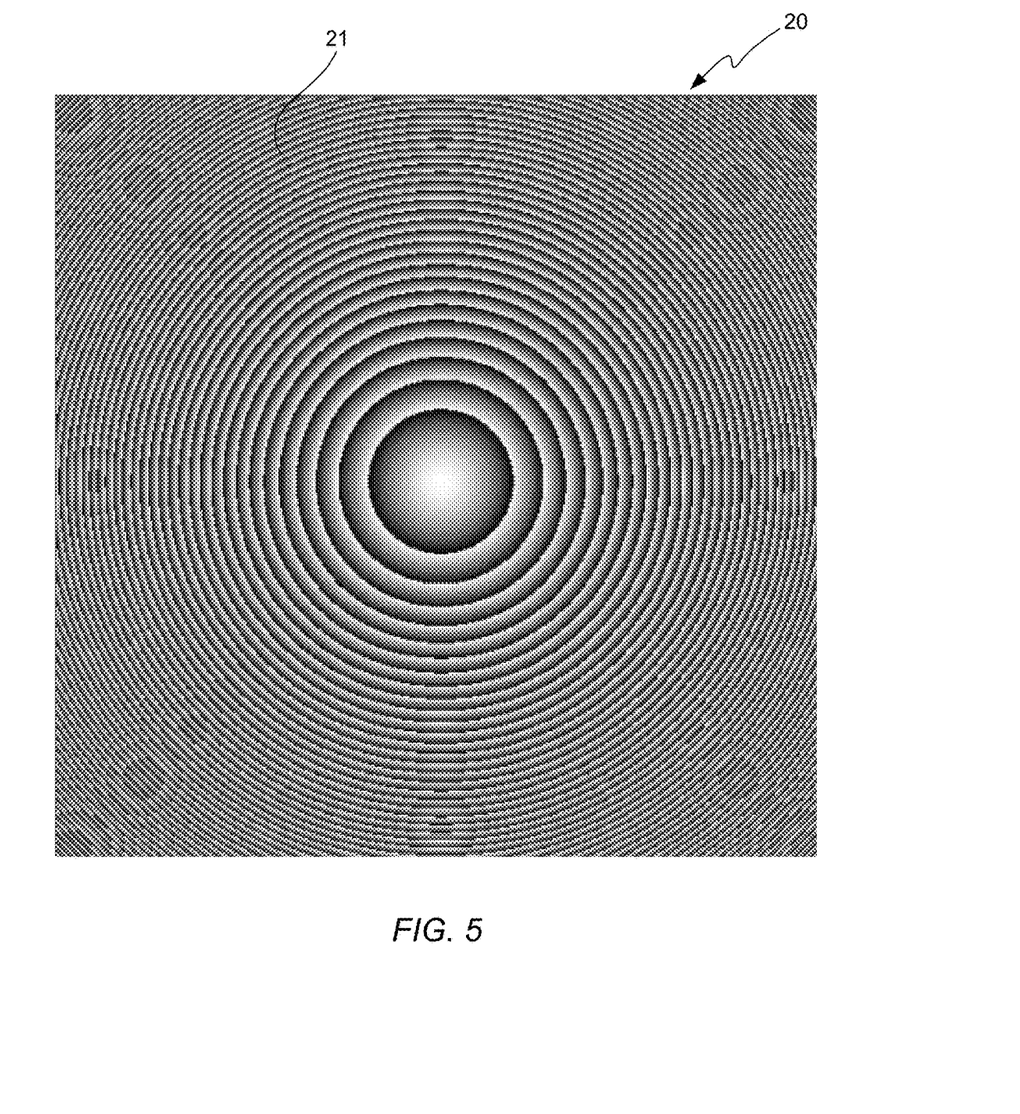
FIG. 5 illustrates a plan view of the glass-based DOE in accordance with an illustrative embodiment in which the glass-based DOE is implemented as a diffractive surface having a preselected diameter and focal length.

FIG. 5 illustrates a plan view of the glass-based DOE 20 in accordance with an illustrative embodiment in which the glass-based DOE 20 is implemented as a diffractive surface 21 having a preselected diameter and focal length. The diffractive surface 21 comprises a diffractive pattern that is preselected to reshape the intensity distribution of the light beam passing out of the end of the optical fiber in a preselected manner. The preselected manner in which the diffractive pattern reshapes the intensity distribution pattern depends on the goal or goals that are to be achieved. The overall goal is to optimize, or at least improve, optical link performance. In accordance with embodiments described herein, optical link performance is achieved by: (1) producing a tightly-focused beam spot on the aperture of the photodetector to increase the response speed of the photodetector; (2) managing the focused beam spot size to avoid an overloading condition of the photodetector; and/or (3) introducing a phase delay in the light reflected from the photodetector such that the phase of any light coupled back into the end of the optical fiber will not be efficiently coupled onto and destabilize the light source at the far end of the optical link. The diffractive pattern is selected to perform one or more of these goals in order to improve or optimize optical link performance.

Figure 6:
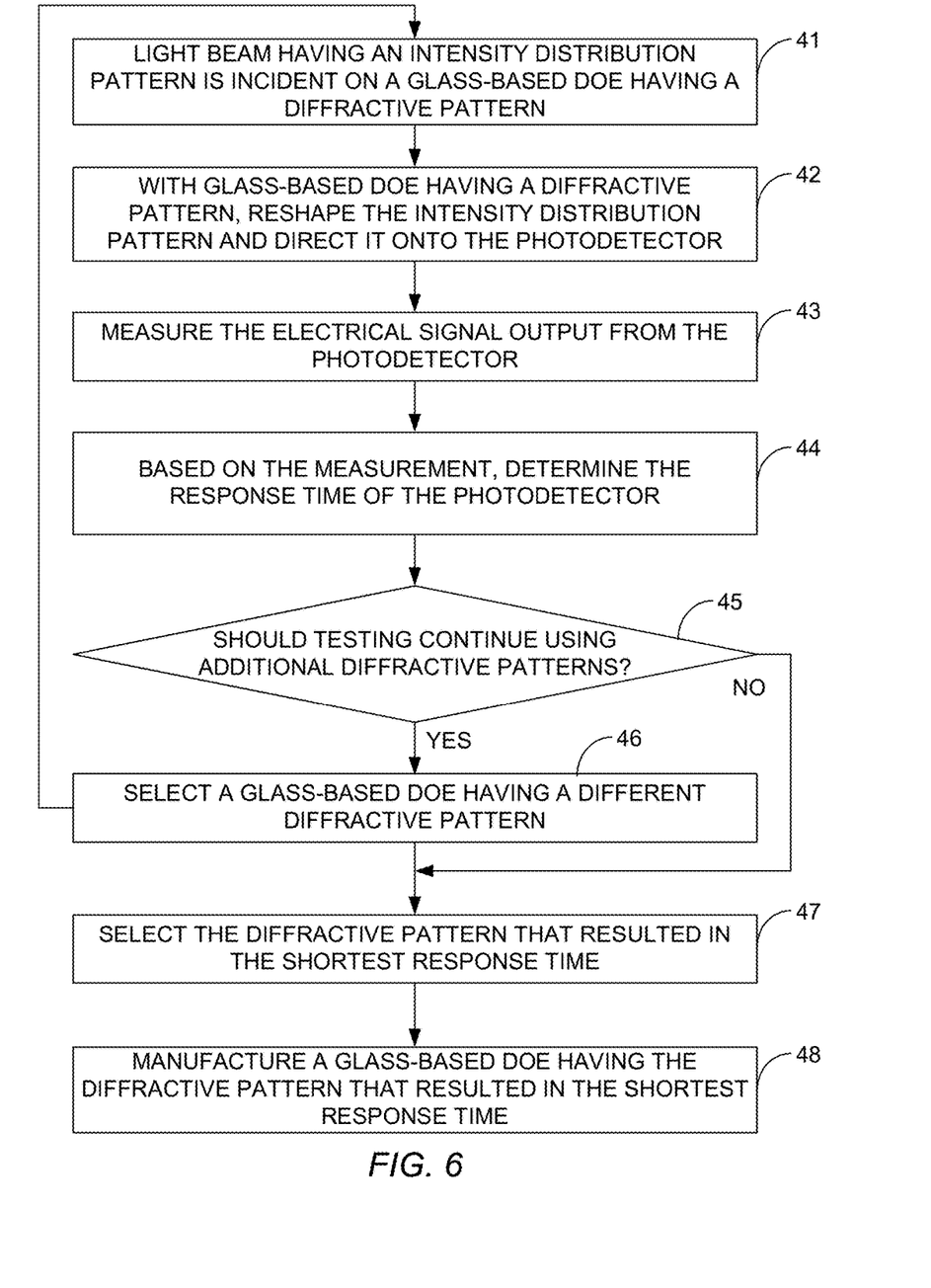
FIG. 6 illustrates a flow chart of the method in accordance with an illustrative embodiment for selecting a glass-based DOE that will shorten the response time of a photodetector.

FIG. 6 illustrates a flow chart of the method in accordance with an illustrative embodiment for selecting a glass-based DOE that will shorten the response time of a photodetector. A light beam having an intensity distribution pattern is incident on a glass-based DOE having a particular diffractive pattern, as indicated by block 41. The glass-based DOE reshapes the intensity distribution pattern and directs it onto a photodetector, as indicated by block 42. A measurement is obtained of an electrical output signal that is output from the photodetector as a result of the reshaped intensity distribution pattern incident on it, as indicated by block 43. Based on the measurement, the response time of the photodetector is determined, as indicated by block 44. A determination is made as to whether testing should be performed using additional diffractive patterns, as indicated by block 45. If so, a glass-based DOE having a different diffractive pattern is selected, as indicated by block 46, and the process returns to the step represented by block 41. After the process represented by blocks 41-46 has been performed a sufficient number of times using different diffractive patterns, the diffractive pattern that resulted in the shortest response time is selected, as indicated by block 47. A glass-based DOE is then manufactured having the selected diffractive pattern, as indicated by block 48.

In the step represented by block 48, the glass-based DOE may be manufactured to achieve goals in addition to or in lieu of achieving the shortest response time. For example, in addition to or in lieu of being designed to increase the response speed of the photodetector, the diffractive pattern of the glass-based DOE can also be designed to control the light beam spot size to avoid an overloading condition that may occur in some photodetectors and/or to prevent back reflection from destabilizing the far-end light source. Also, in some applications, the diffractive pattern that is ultimately selected for the DOE may be one that achieves a response time that is deemed to be sufficiently short, but not the shortest of all of the diffractive patterns tested. For example, there may be a tradeoff between reducing the response time and achieving other criteria, e.g., avoiding an overloading condition of the photodetector, providing a particular focal length, providing a particular DOE aperture diameter and/or providing a particular light beam spot diameter. Persons of skill in the art will understand, in view of the description provided herein, the manner in which such additional factors may be taken into account in selecting a diffractive pattern for the glass-based DOE.

The process described above with reference to FIG. 6 may be performed empirically using an actual photodetector as a device under test (DUT) in conjunction with actual glass-based DOEs having different diffractive patterns to determine which glass-based DOE achieves suitable results based on the output of the photodetector. Alternatively, the process may be performed using computer-based modeling and simulation. For example, in the latter case, the diffractive surface 21 of the DOE 20 may be designed based on a computer-generated hologram that provides a preselected focal length, light beam spot diameter and reshaped intensity distribution pattern preselected to control the beam spot in a way that improves optical link performance.

In the latter case, once the holographic pattern has been selected, a glass-based DOE that has the holographic pattern as its diffractive surface is manufactured. The diffractive surface is formed by mapping the phase pattern of the selected holographic pattern into spatial variations in the thickness and/or index of refraction of a glass substrate. As indicated above, photolithographic processes are well suited for forming the random spatial variations in the thickness and/or index of refraction of the glass substrate. U.S. Pat. No. 8,019,233, which issued on Sep. 13, 2011 and which is assigned to the assignee of the present application, describes methods and systems for designing and manufacturing an optical coupling system of an optical transmitter with a diffractive pattern formed therein. The methods and systems disclosed in that patent, which is hereby incorporated by reference herein in its entirety, are equally well suited for forming the diffractive surface in the glass-based DOE of the invention. Therefore, in the interest of brevity, a detailed discussion of those methods and systems will not be provided herein. While other processes may be used to manufacture the glass-based DOE, using photolithography for this purpose provides several advantages. One advantage is that the glass-based DOEs can be manufactured with very high precision. Another advantage is that the glass-based DOEs can be manufactured at high volume with high yield and at relatively low cost.

Figure 7:
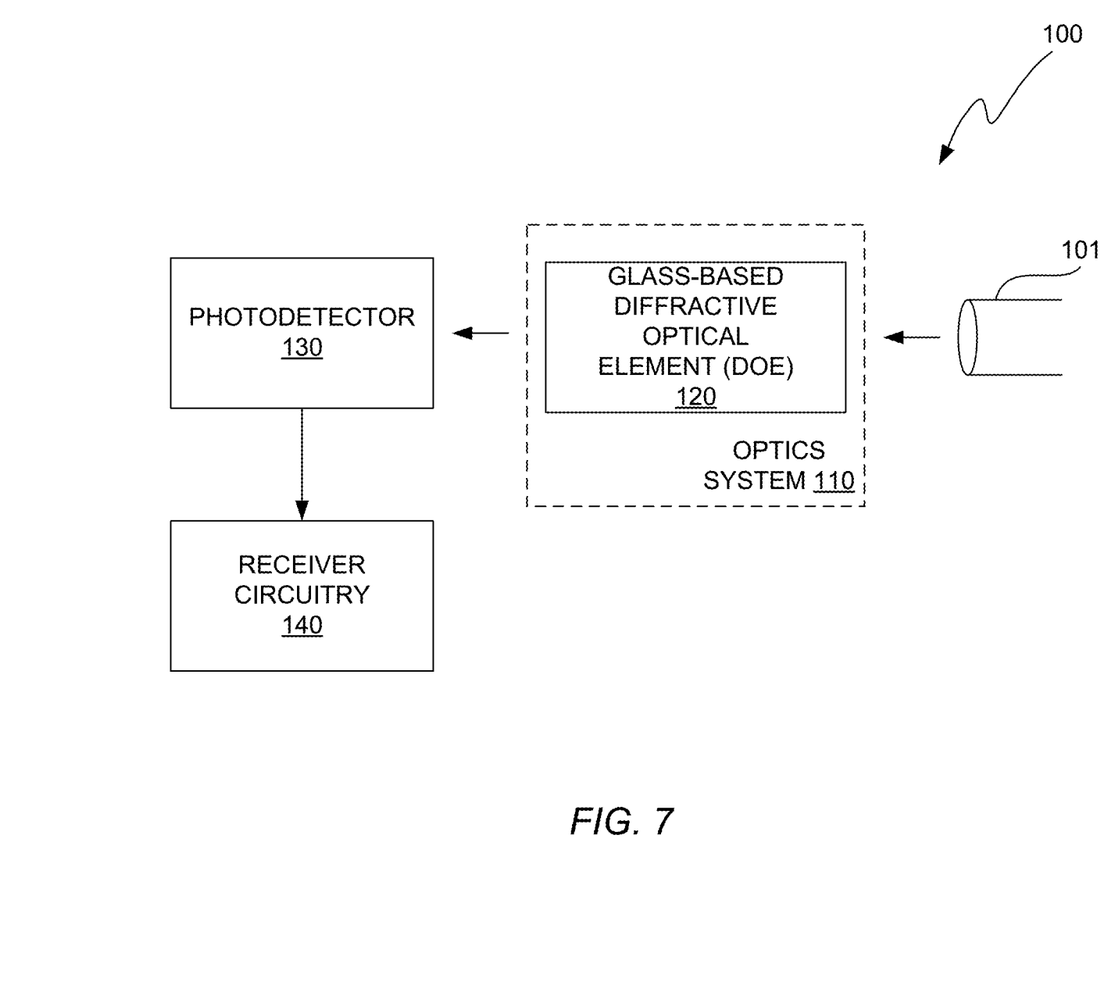
FIG. 7 illustrates an optical communications module having an optics system that incorporates the glass-based DOE in accordance with an illustrative embodiment.

FIG. 7 illustrates an optical communications module 100 having an optics system 110 that incorporates the glass-based DOE 120 in accordance with an illustrative embodiment. The optics system 110 may include optical elements in addition to the glass-based DOE 120, such as, for example, one or more refractive optical elements (e.g., aspherical lenses) and/or reflective optical elements (e.g., one or more total internal reflection (TIR) surfaces) and/or diffractive elements (e.g., other diffractive lenses or DOEs). An optical data signal passing out of the end of an optical waveguide 101 has an intensity distribution pattern that is reshaped by the glass-based DOE 120. The glass-based DOE 120 directs the reshaped intensity distribution pattern onto the photodetector 130. As indicated above, the glass-based DOE 120 has a diffractive surface (not shown) that reshapes the intensity distribution pattern in a predetermined manner to improve link performance. The photodetector 130 is typically a PIN diode, although it may be any suitable optical detector. Receiver circuitry 140, which typically includes a transimpedance amplifier (TIA) and a receiver IC, processes the output signal from the photodetector 130 to recover the data.

The reshaped intensity distribution pattern may be a ring-shaped intensity distribution pattern such as that shown in FIG. 1, or it may be some other pattern that optimizes, or at least improves, the overall link performance for higher data rate communications. For example, it is possible that the response time of a photodetector can be reduced by reshaping the intensity distribution pattern to focus most of the optical energy onto areas of the aperture that are very near the electrodes. This could speed up electron collection, resulting in reduced response times. Because the glass-based DOE can be made much thinner than a comparable conventional refractive optical element, using the glass-based DOE avoids problems associated with producing a refractive lens having large sag. Also, because the glass-based DOE 120 has a very low CTE, it is reliable over a wide range of temperatures.

Yet another benefit of the glass-based DOE 120 is that it increases return loss by preventing light that is reflected by the photodetector from re-entering the end of the optical fiber with a suitable phase that would allow the light to be efficiently coupled onto the laser diode at the far end of the optical link. Any light that may be reflected off of the photodetector is manipulated (e.g., scattered and/or modified in phase) by the diffractive pattern of the DOE so that very little, if any, of the light is coupled back into the optical fiber. In particular, the glass-based DOE 120 introduces a radially-asymmetric phase delay in the light reflected by the photodetector so that any light that reenters the end of the optical fiber will not have a phase that allows the light to be efficiently coupled onto the laser diode at the far end of the optical link.

Figure 8:
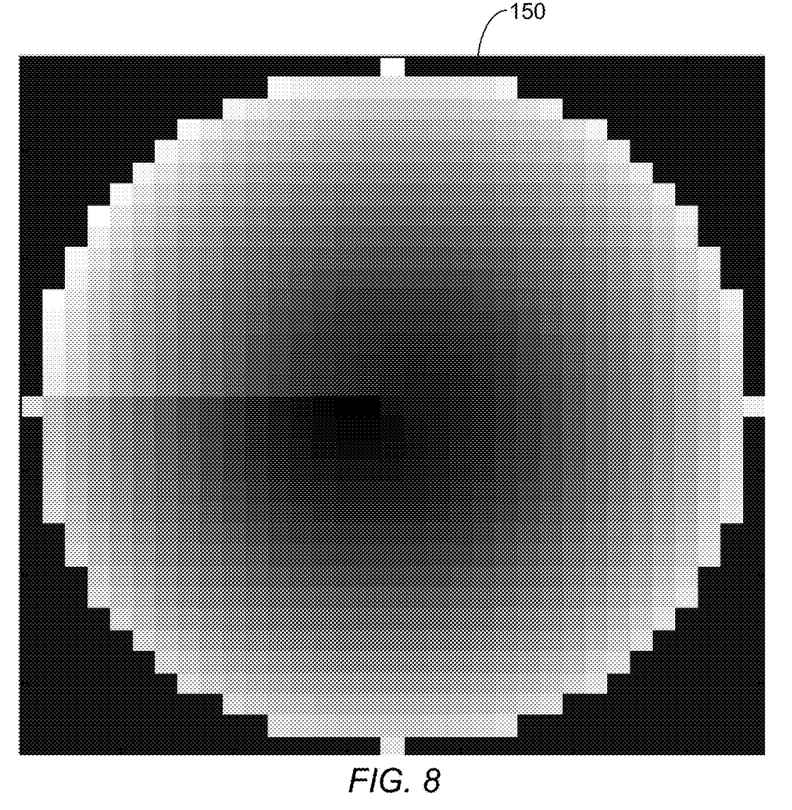
FIG. 8 illustrates a plan view of a glass-based DOE in accordance with an illustrative embodiment implemented as an analog freeform optical element that introduces a radially-asymmetric phase delay in light reflected by the photodetector.

FIG. 8 illustrates a plan view of a glass-based DOE 150 in accordance with an illustrative embodiment implemented as an analog freeform DOE that introduces a radially-asymmetric phase delay in the light reflected by the photodetector. Introducing a radially-asymmetric phase delay ensures so that any light that reenters the end of the optical fiber 101 will not have a phase that allows the light to be efficiently coupled onto the laser diode at the far end of the optical link. The analog freeform DOE 150 is defined by a phase pattern having phase values that range from $-2\pi$ to $+2\pi$, with $-2\pi$ corresponding to the smallest phase delay and $+2\pi$ corresponding to the greatest phase delay. The phase values are calculated as:

$$\text{Phase Value} = M \times \Phi, \quad \text{Equation 1}$$

where M is a constant, typically an integer, and $\Phi$ is the azimuth angle of a polar coordinate system having a Z-axis corresponding to the optical axis of the analog freeform DOE 150. Examples of analog freeform DOEs that are suitable for introducing such radially-asymmetric phase delays are vortex lenses, spiral lenses and eclipse lenses.

In accordance with another illustrative embodiment, the aperture shape of the photodetector is designed based at least in part on the reshaped intensity distribution pattern obtained by the glass-based DOE to further increase the response speed of the photodetector and/or to improve other link performance parameters. Using the glass-based DOE provides more flexibility in designing the aperture of the photodetector because the glass-based DOE can be designed to reshape the intensity distribution pattern in many different ways. The shape of the aperture, which is defined by the electrode, is a ring shape in almost all cases. Reshaping the intensity distribution pattern of the light passing out of the end of the optical fiber allows other, customized shapes for the photodetector aperture to be used to achieve faster response speeds. Other shapes for the photodetector aperture made possible by use of the glass-based DOE can also lead to reduced optical losses and reduced mode-selective losses.

It should be noted that illustrative embodiments have been described herein for the purpose of demonstrating principles and concepts of the invention. As will be understood by persons of skill in the art in view of the description provided herein, many modifications may be made to the embodiments described herein without deviating from the scope of the invention. For example, while FIG. 7 shows a single channel of an optical communications module 100, the optical communications module may have multiple channels, in which case the glass-based DOE either has multiple respective diffractive patterns formed therein for operating on the different optical signals or multiple DOEs having respective diffractive patterns formed therein are arrayed to operate on the different optical signals.

What is claimed is:

1. An optical communications module for communication over an optical link, the module comprising:
   at least a first photodetector; and
   an optics system, the optics system comprising at least a first glass-based diffractive optical element (DOE) having at least a first diffractive surface formed therein that receives an optical signal passing out of an end of an optical waveguide and reshapes an intensity distribution pattern of the received optical signal into a preselected reshaped intensity distribution pattern prior to coupling the reshaped intensity distribution pattern onto an aperture of the first photodetector, wherein the preselected reshaped intensity distribution pattern improves performance of the optical link by shortening a response time of the first photodetector, preventing an overloading condition of the first photodetector and managing back reflection of light from the first photodetector.

2. The optical communications module of claim 1, wherein the first diffractive surface creates a light beam spot having a preselected diameter at a location where the reshaped intensity distribution pattern is incident on the aperture of the first photodetector.

3. The optical communications module of claim 2, wherein the reshaped intensity distribution pattern is a ring-shaped intensity distribution pattern having lower intensity levels in a central region of the pattern and higher intensity values in a ring-shaped region surrounding the central region.

4. The optical communications module of claim 1, wherein the first diffractive surface is defined by spatial variations in a thickness of a glass substrate of the glass-based DOE.

5. The optical communications module of claim 1, wherein the first diffractive surface is defined by spatial variations in an index of refraction of a glass substrate of the glass-based DOE.

6. The optical communications module of claim 1, wherein the glass-based DOE is a photolithographically-manufactured device.

7. The optical communications module of claim 1, wherein the glass-based DOE is a molded device.

8. The optical communications module of claim 1, wherein the first diffractive surface reshapes the intensity distribution pattern in a way that couples a majority of optical energy of the reshaped intensity distribution pattern near electrodes of the first photodetector.

9. The optical communications module of claim 1, wherein the first photodetector has an aperture that is shaped based at least in part on the preselected reshaped intensity distribution pattern.

10. A method for increasing a bandwidth of an optical communications link, the method comprising:
    selecting a glass-based diffractive optical element (DOE) to be used to receive and couple an optical signal passing out of an end of an optical waveguide onto an aperture of a photodetector of an optical communications module of the link, wherein the selection of the glass-based DOE is based on a determination that at least a first diffractive surface of the glass-based DOE will reshape an intensity distribution pattern of the optical signal into a preselected reshaped intensity distribution pattern that will improve performance of the link by shortening a response time of the photodetector, preventing an overloading condition of the photodetector and managing back reflection of light from the photodetector; and installing the selected glass-based DOE in an optics system of the optical communications module to couple the optical signal passing out of the end of the optical waveguide onto the aperture of the photodetector.

11. The method of claim 10, wherein the step of selecting the glass-based DOE includes performing testing with a plurality of glass-based DOEs having different diffractive surfaces to determine which of the glass-based DOEs results in a best improvement in link performance.

12. The method of claim 10, wherein the step of selecting the glass-based DOE includes performing computer-based simulations with a plurality of computer models of the glass-based DOE having different diffractive surface designs to determine which of the glass-based DOE models results in a best improvement in link performance.

13. The method claim 10, wherein the selected glass-based DOE creates a light beam spot having a preselected diameter at a location where the reshaped intensity distribution pattern is incident on the aperture of the photodetector.

14. The method of claim 10, wherein the reshaped intensity distribution pattern is a ring-shaped intensity distribution pattern having lower intensity levels in a central region of the pattern and higher intensity values in a ring-shaped region surrounding the central region.

15. The method of claim 10, wherein the first diffractive surface is defined by spatial variations in a thickness of a glass substrate of the glass-based DOE.

16. The method of claim 10, wherein the first diffractive surface is defined by spatial variations in an index of refraction of a glass substrate of the glass-based DOE.

17. The method of claim 10, wherein the glass-based DOE is a photolithographically-manufactured device.

18. The method of claim 10, wherein the glass-based DOE is a molded device.

19. The method of claim 10, wherein the first diffractive surface is preselected to reshape the intensity distribution pattern in a way that couples a majority of optical energy of the reshaped intensity distribution pattern near electrodes of the photodetector.

20. The method of claim 10, wherein the first diffractive surface is preselected to reshape the intensity distribution pattern in a way that prevents an overloading condition of the photodetector.

21. The method of claim 10, wherein the photodetector has an aperture that is shaped based at least in part on the preselected reshaped intensity distribution pattern.

22. The method of claim 10, wherein the selection of the glass-based DOE is based on a determination that the first diffractive surface will reshape the intensity distribution pattern of the optical signal into a preselected reshaped intensity distribution pattern that will shorten the response time of the photodetector.

23. The method of claim 10, wherein the selection of the glass-based DOE is based on a determination that the first diffractive surface will reshape the intensity distribution pattern of the optical signal into a preselected reshaped intensity distribution pattern that will prevent the overloading condition of the photodetector.

24. The method of claim 10, wherein the selection of the glass-based DOE is based on a determination that the first diffractive surface will reshape the intensity distribution pattern of the optical signal into a preselected reshaped intensity distribution pattern that will manage back reflection of light from the photodetector.

* * * * *

UNITED STATES PATENT AND TRADEMARK OFFICE
CERTIFICATE OF CORRECTION

PATENT NO. : 10,451,889 B2
APPLICATION NO. : 14/919829
DATED : October 22, 2019
INVENTOR(S) : Bing Shao et al.

Page 1 of 1

It is certified that error appears in the above-identified patent and that said Letters Patent is hereby corrected as shown below:

On the Title Page

Item (71), Column 1: REPLACE "Avago Technologies International Sales Pte, Limited" with "Avago Technologies International Sales Pte. Limited"

Signed and Sealed this
Eighteenth Day of February, 2020

Andrei Iancu
*Director of the United States Patent and Trademark Office*